(12) United States Patent
Zhang et al.

(10) Patent No.: US 11,877,043 B2
(45) Date of Patent: Jan. 16, 2024

(54) OPTICAL LENS, CAMERA MODULE AND CAMERA

(71) Applicant: JIANGXI LIANYI OPTICS CO., LTD., Nanchang (CN)

(72) Inventors: Tian Zhang, Nanchang (CN); Xuming Liu, Nanchang (CN); Haojie Zeng, Nanchang (CN); Jiyong Zeng, Nanchang (CN)

(73) Assignee: JIANGXI LIANYI OPTICS CO., LTD., Nanchang (CN)

( * ) Notice: Subject to any disclaimer, the term of this patent is extended or adjusted under 35 U.S.C. 154(b) by 190 days.

(21) Appl. No.: 17/585,507

(22) Filed: Jan. 26, 2022

(65) Prior Publication Data
US 2022/0159153 A1 May 19, 2022

Related U.S. Application Data

(63) Continuation-in-part of application No. PCT/CN2020/095106, filed on Jun. 9, 2020.

(30) Foreign Application Priority Data

Aug. 1, 2019 (CN) .......................... 201910705523.9

(51) Int. Cl.
*H04N 23/55* (2023.01)
*G02B 15/14* (2006.01)
*G03B 30/00* (2021.01)

(52) U.S. Cl.
CPC ..... *H04N 23/55* (2023.01); *G02B 15/145117* (2019.08); *G03B 30/00* (2021.01)

(58) Field of Classification Search
CPC .. H04N 23/55; G02B 15/145117; G02B 9/60; G02B 13/18; G02B 13/0045; G02B 13/0055; G03B 30/00; G03B 9/02
See application file for complete search history.

(56) References Cited

FOREIGN PATENT DOCUMENTS

| CN | 102998776 A | 3/2013 |
|---|---|---|
| CN | 104345433 A | 2/2015 |
| CN | 204143050 U | 2/2015 |
| CN | 204188872 U | 3/2015 |
| CN | 104570280 A | 4/2015 |

(Continued)

OTHER PUBLICATIONS

SIPO, First Office Action for CN Application No. 201910705523.9, dated Sep. 24, 2019.

(Continued)

*Primary Examiner* — Twyler L Haskins
*Assistant Examiner* — Angel L Garces-Rivera

(57) ABSTRACT

Disclosed are an optical lens, a camera module and a camera. From an object side to an image side along an optical axis, the optical lens includes: a first lens having a positive focal power and a convex object side surface; a second lens having a negative focal power; a third lens having a negative focal power; a fourth lens having a negative focal power; a fifth lens having a positive focal power, an object side surface of the fifth lens is convex at a paraxial region thereof, and an image side surface of the fifth lens is concave at a paraxial region thereof; a stop disposed between the second and third lens; and a filter disposed between the fifth lens and an imaging plane. The camera module includes the optical lens and an image sensor, and the camera includes the camera module.

20 Claims, 10 Drawing Sheets

(56) References Cited

FOREIGN PATENT DOCUMENTS

| | | |
|---|---|---|
| CN | 104793319 A | 7/2015 |
| CN | 204536635 U | 8/2015 |
| CN | 107367818 A | 11/2017 |
| WO | 2016158886 A1 | 10/2016 |

OTHER PUBLICATIONS

SIPO, Office Action issued for CN Application No. 201910705523.9, dated Oct. 10, 2019.
WIPO, Written opinion of the International Search Authority for PCT Application No. PCT/CN2020/095106, dated Sep. 7, 2020.
WIPO, International Search Report for PCT Application No. PCT/CN2020/095106, dated Sep. 7, 2020.

OPTICAL LENS, CAMERA MODULE AND CAMERA

CROSS-REFERENCE TO RELATED APPLICATION

This application is a continuation-in-part of an international application No. PCT/CN2020/095106 filed on Jun. 9, 2020. This international application claims priority to a Chinese patent application No. 201910705523.9 filed with China National Intellectual Property Administration on Aug. 1, 2019. The entirety of the two applications is hereby incorporated into this application by reference.

TECHNICAL FIELD

The present disclosure relates to the field of optical lens technologies, and particularly to an optical lens, a camera module and a camera.

BACKGROUND

At present, with the popularization of portable electronic devices (such as smart phones and cameras) and the popularity of social software, video software and live broadcast software, people are more and more fond of photography, and camera lenses have become standard configurations for the electronic devices. In particular, the camera lenses have even become a primary consideration for consumers at the time of buying an electronic device. In recent years, with the continuous development of design as well as manufacturing and processing technologies, the camera lenses continuously develop toward small volume, light weight and high performance.

However, the inventor found from the research on related camera lenses that, as people's requirements for image quality gradually increase, the size of the used chip is increased and the volume of the camera lens is accordingly increased, which makes it difficult for an optical lens to continue developing towards miniaturization while ensuring the image quality.

SUMMARY

In an aspect, an optical lens is provided by the embodiments of the present disclosure. From an object side to an image side along an optical axis, the optical lens sequentially includes: a first lens with a positive focal power, where an object side surface of the first lens is convex; a second lens with a negative focal power; a third lens with a negative focal power; a fourth lens with a negative focal power; a fifth lens with a positive focal power, where an object side surface of the fifth lens is convex at a paraxial region thereof and an image side surface of the fifth lens is concave at a paraxial region thereof; a stop disposed between the second lens and the third lens; and a filter disposed between the fifth lens and an imaging plane. The first lens, the second lens, the third lens, the fourth lens and the fifth lens are all aspherical lenses. The optical lens satisfies an expression:

$$-1 < f_{12}/f_{345} < 0;$$

where $f_{12}$ is a combined focal length of the first lens and the second lens, and $f_{345}$ is a combined focal length of the third lens, the fourth lens and the fifth lens.

In another aspect, an imaging device is provided by the embodiments of the present disclosure, which includes the above-mentioned optical lens, and an imaging component configured to convert an optical image formed by the optical lens into an electronic signal.

In further another aspect, a camera module is provided, which includes the above-mentioned optical lens and an image sensor opposite to the optical lens.

In still further another aspect, a camera is provided, which includes the camera module as mentioned above, a processor and a memory. The camera module is configured to capture one or more images. The processor is configured to process the captured one or more images. The memory is configured to store the captured one or more images.

The above aspects and other aspects of the embodiments of the present disclosure will be clearer and more understandable in the description of the following embodiments.

BRIEF DESCRIPTION OF THE DRAWINGS

In order to more clearly illustrate the technical solutions in the embodiments of the present disclosure, the drawings used in the description of the embodiments will be briefly described below.

Obviously, the drawings in the following description just show some embodiments of the present disclosure. Those of ordinary skill in the art can also obtain other drawings according to these drawings without paying any creative work.

DETAILED DESCRIPTION OF PREFERRED EMBODIMENTS

Figure 1:
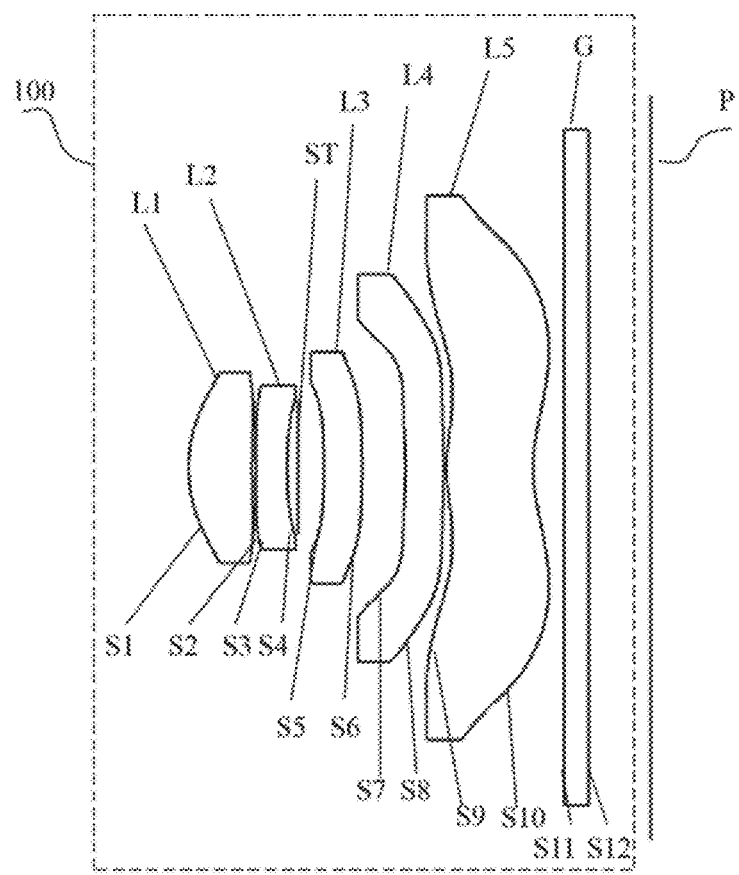
FIG. 1 is a schematic structural diagram of an optical lens provided by a first embodiment of the present disclosure.

In order to facilitate understanding of the present disclosure, the present disclosure will be described comprehensively below with reference to the related drawings. Various embodiments of the present disclosure are shown in the drawings. However, the present disclosure can be implemented in many different forms and is not limited to the embodiments described herein. Rather, the purpose of these embodiments is to make the present disclosure more thorough and comprehensive.

Unless otherwise defined, all technical and scientific terms used herein have the same meaning as commonly understood by those skilled in the technical field of the present disclosure. The terms used in the description of the present disclosure herein are only for the purpose of describing specific embodiments, and are not intended to limit the present disclosure. The terms "and/or" as used herein include any of one or more listed items and all combinations thereof.

Embodiment 1

Referring to FIG. 1, a schematic structural diagram of an optical lens 100 provided by a first embodiment of the present disclosure is shown.

In this embodiment, as shown in FIG. 1, from an object side to an image side along an optical axis, the optical lens 100 sequentially includes a first lens L1, a second lens L2, a stop ST, a third lens L3, a fourth lens L4, a fifth lens L5, and a filter G.

The first lens L1 has a positive focal power. An object side surface S1 of the first lens L1 is convex and an image side surface S2 of the first lens L1 is convex.

The second lens L2 has a negative focal power. An image side surface S4 of the second lens L2 is concave.

The stop ST is disposed behind the second lens L2, specifically, the stop ST is disposed between the second lens L2 and the third lens L3. Accordingly, the sensitivity of the first lens L1 and the second lens L2 can be effectively reduced, and thus the first and second lenses can be easily processed and produced.

The third lens L3 has a negative focal power. An object side surface S5 of the third lens L3 is concave, and an image side surface S6 of the third lens L3 is convex.

The fourth lens L4 has a negative focal power. An object side surface S7 of the fourth lens L4 is concave, and an image side surface S8 of the fourth lens L4 is convex.

The fifth lens L5 has a positive focal power. An object side surface S9 of the fifth lens L5 is convex at a paraxial region thereof, and an image side surface S10 of the fifth lens L5 is concave at a paraxial region thereof. The aberrations of the optical lens can be effectively corrected, and thus the exit angle of light can be effectively controlled.

As an implementation, the first lens L1, the second lens L2, the third lens L3, the fourth lens L4, and the fifth lens L5 may be aspherical lenses. By adopting aspherical lenses, the number of lenses can be effectively reduced, and a good optical performance can be provided while reducing the weight and volume.

Preferably, in some implementations, the first lens L1, the second lens L2, the third lens L3, the fourth lens L4, and the fifth lens L5 may all be plastic aspherical lenses. The plastic material enables the volume of the optical lens and the manufacturing cost thereof to be effectively reduced.

As shown in FIG. 1, in this embodiment, the optical lens 100 may further include the filter G disposed between the fifth lens L5 and an imaging plane P. The filter G can be used to selectively filter a part of the light, so as to optimize the imaging effect.

In this embodiment, the imaging plane P may be a plane where a clear image can be formed on the image side by the light incident from the object side and passing through the optical lens 100.

Figure 2:
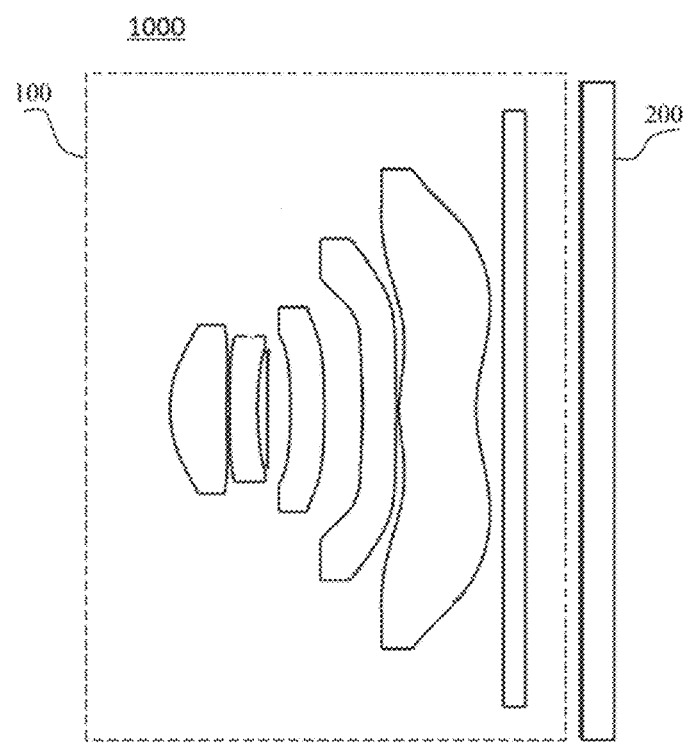
FIG. 2 is a schematic structural diagram of an imaging device provided by the first embodiment of the present disclosure.
Figure 3:
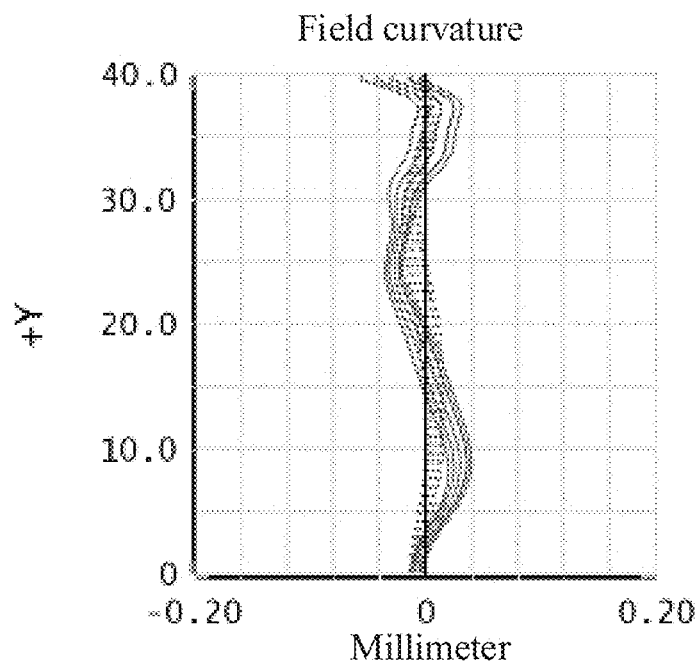
FIG. 3 is a diagram showing field curvature curves of the optical lens provided by the first embodiment of the present disclosure.
Figure 4:
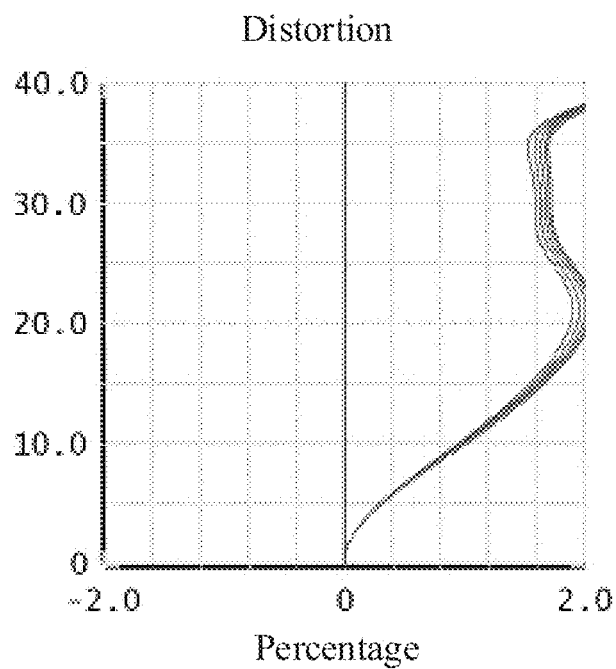
FIG. 4 is a diagram showing distortion curves of the optical lens provided by the first embodiment of the present disclosure.
Figure 5:
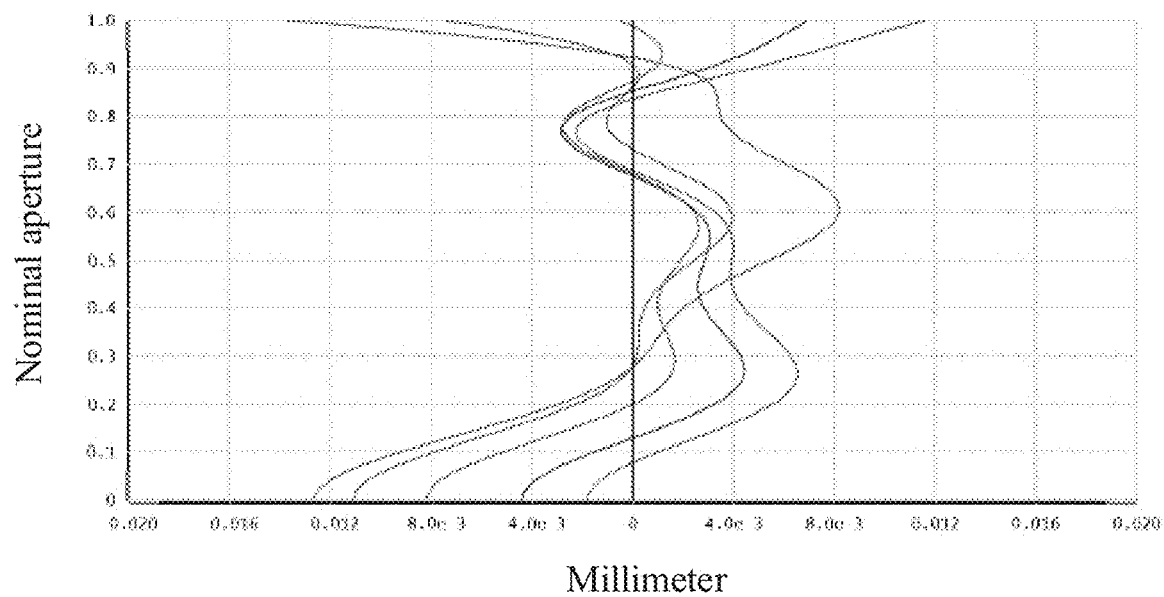
FIG. 5 is a diagram showing on-axis spherical aberration curves of the optical lens provided by the first embodiment of the present disclosure.
Figure 6:
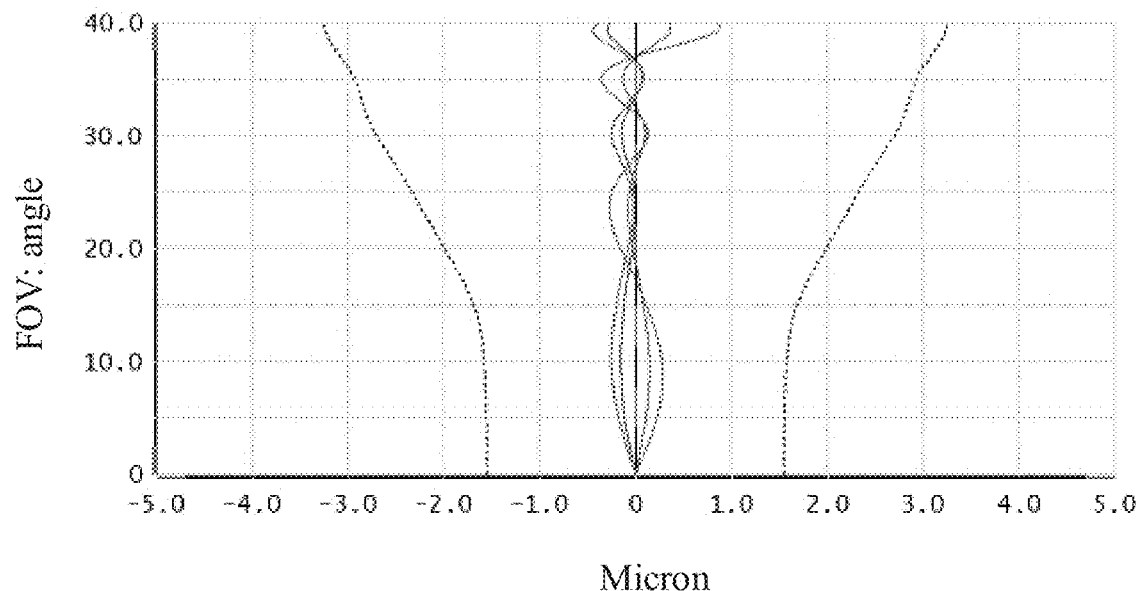
FIG. 6 is a diagram showing lateral chromatic aberration curves of the optical lens provided by the first embodiment of the present disclosure.

Referring to FIG. 2, a schematic structural diagram of an imaging device 1000 provided by this embodiment is shown. The imaging device 1000 includes the above-mentioned optical lens 100 and an imaging component 200 for converting an optical image formed by the optical lens 100 into an electrical signal. As an implementation, the imaging component 200 is disposed on the image side of the optical lens 100, and the photosensitive surface of the imaging component 200 (i.e., a surface of the imaging component 200 facing towards the optical lens 100) can overlap with the imaging surface P to obtain a clear image. In some implementations, the imaging component 200 may be a photoelectric sensor device used in imaging, such as Charge-coupled Device (CCD), and Complementary Metal Oxide Semiconductor (CMOS).

As an implementation, the imaging device 1000 may be applied to an optical imaging system of a small portable electronic device.

Further, in some implementations, the optical lens 100 satisfies an expression:

$$-1 < f_{12}/f_{345} < 0;$$

where $f_{12}$ is a combined focal length of the first lens L1 and the second lens L2, and $f_{345}$ is a combined focal length of the third lens L3, the fourth lens L4 and the fifth lens L5. When this expression is satisfied, the sensitivity to eccentricity of the optical lens can be effectively reduced, and the resolution of the edge of the optical lens can be improved.

Further, in some implementations, the optical lens 100 satisfies expressions:

$$0.8 < CT_{2\text{-}i}/CT_2 < 1.2; \text{ and}$$

$$0.8 < CT_{3\text{-}i}/CT_3 < 1.2;$$

where $CT_{2\text{-}i}$ is a thickness at any position of the second lens along a normal direction (a direction of a line perpendicular to a tangent to an aspheric curve at the any position of the second lens), $CT_{3-i}$ is a thickness at any position of the third lens along a normal direction (a direction of a line perpendicular to a tangent to an aspheric curve at the any position of the third lens), $CT_2$ is a center thickness of the second lens, and $CT_3$ is a center thickness of the third lens. The values of $CT_{2-i}/CT_2$ and $CT_{3-i}/CT_3$ are both greater than 0.8, which facilitates the shaping of the second lens L2 and the third lens L3, and causes high-order aberrations not easily to occur for the off-axis light, thereby obtaining stable performance. The values of $CT_{2-i}/CT_2$ and $CT_{3-i}/CT_3$ are both less than 1.2, which causes the difficulty of correcting field curvature and coma to be reduced. That is, when the values of $CT_{2-i}/CT_2$ and $CT_{3-i}/CT_3$ are within the range of the expressions mentioned above, the second lens L2 and the third lens L3 are enabled to have a uniform thickness at any position, and they can be easily shaped.

Further, in some implementations, the optical lens 100 satisfies an expression:

$$0 \le f_1/f < 1;$$

where $f_1$ is a focal length of the first lens, and f is a focal length of the optical lens. The value of $f_1/f$ is greater than 0, which avoids the focal power and the sensitivity to eccentricity of the first lens L1 from being increased. The value of $f_1/f$ is less than 1, which enables the difficulty of correcting the field curvature to be reduced.

Further, in some implementations, the optical lens 100 satisfies an expression:

$$3 \le f_5/f < 6;$$

where $f_5$ is a focal length of the fifth lens, and f is the focal length of the optical lens. The value of $f_5/f$ is greater than 3, which avoids the focal power and the sensitivity to eccentricity of the fifth lens L5 from being increased. The value of $f_5/f$ is less than 6, which enables the difficulty of correcting the field curvature to be reduced.

Further, in some implementations, the optical lens 100 satisfies an expression:

$$-3 < (R_7+R_8)/(R_7-R_8) < 0;$$

where $R_7$ is a radius of curvature of the object side surface of the fourth lens, and $R_8$ is a radius of curvature of the image side surface of the fourth lens. The expression defines a curve shape of the fourth lens L4. When the value of $(R_7+R_8)/(R_7-R_8)$ is greater than −3, high-order aberrations are unlikely to occur for the off-axis light, thereby obtaining stable performance. When the value of $(R_7+R_8)/(R_7-R_8)$ is less than 0, the difficulty of correcting field curvature and coma is reduced.

Further, in some implementations, the optical lens 100 satisfies an expression:

$$15 < R_9/f_5 < 30;$$

where $R_9$ is a radius of curvature of the object side surface of the fifth lens, and $f_5$ is a focal length of the fifth lens. When the value of $R_9/f_5$ is greater than 15, it avoids the field curvature and distortion from being increased excessively in a negative direction, thereby reducing the difficulty of correction. When the value of $R_9/f_5$ is less than 30, it avoids the field curvature and distortion from being increased excessively in a positive direction, thereby also reducing the difficulty of correction.

Further, in some implementations, the optical lens 100 satisfies an expression:

$$0 < Td/ImgH < 2;$$

where Td is a distance on the optical axis that is between the object side surface of the first lens and the image side surface of the fifth lens, and ImgH is half of an image height of the optical lens on the imaging plane. When this expression is satisfied, the total optical length of the optical lens can be effectively shortened, and the miniaturization of the optical lens 100 is promoted.

Further, the maximum diameter of the fifth lens is greater than that of each of the first lens, the second lens, the third lens and the fourth lens, and a diameter of the stop is smaller than the maximum diameter of each of the lenses. A center thickness of the fifth lens is greater than that of each of the first lens, the second lens, the third lens and the fourth lens.

Further, a distance on the optical axis that is between the third lens and the fourth lens is greater than a distance on the optical axis that is between the stop and the third lens.

Further, at least a portion away from the optical axis of the object side surface of the fifth lens is concave, and at least a portion away from the optical axis of the image side surface of the fifth lens is convex.

Further, the center thickness of the first lens is greater than a center thickness of the second lens.

In this embodiment, as an implementation, when all lenses of the optical lens 100 are aspherical lenses, and the surface shape of each aspherical lens satisfies an expression:

$$z = \frac{ch^2}{1+\sqrt{1-(1+k)c^2h^2}} + \Sigma A_{2i} h^{2i};$$

where z represents a vector height between a point on a curved surface and a vertex of the curved surface along the optical axis, h is a distance between the point on the curved surface and the optical axis, c is a paraxial radius of the surface, k is quadratic surface coefficient conic, and $A_{2i}$ is a 2i-th order aspheric profile coefficient.

In the optical lens 100 and the imaging device 1000 provided by this embodiment, by means of reasonable coordination of the shapes of the first lens L1, the second lens L2, the third lens L3, the fourth lens L4, and the fifth lens L5 as well as combination of the focal powers of these lenses, the size of the entire optical lens 100 can be effectively reduced, and a clear image can be obtained with a large aperture. In some implementations, five plastic aspherical lenses are adopted, and thus the optical lens has a small volume and a compact structure, and can provide a good optical imaging quality, thereby being suitable for various portable electronic devices.

Referring to FIG. 3, FIG. 4, FIG. 5 and FIG. 6, field curvature curves, distortion curves, on-axis spherical aberration curves, and lateral chromatic aberration curves of the optical lens 100 provided in this embodiment are shown, respectively. It can be seen from the drawings that the field curvature, distortion and chromatic aberration are all well corrected.

Specifically, the design parameters of the optical lens 100 provided by this embodiment are shown in Table 1.

TABLE 1

| Surface No. | | Radius of curvature (mm) | Thickness (mm) | Refractive index | Abbe number |
|---|---|---|---|---|---|
| | Object surface | — | — | | |
| S1 | First lens L1 | 1.180 | 0.535 | | |
| S2 | | 6.689 | 0.029 | 1.544 | 55.987 |
| S3 | Second lens | 9.906 | 0.269 | | |
| S4 | L2 | 3.785 | 0.090 | 1.671 | 19.238 |
| ST | Stop ST | — | 0.222 | | |
| S5 | Third lens L3 | −6.813 | 0.322 | 1.651 | 21.514 |
| S6 | | −9.746 | 0.366 | | |
| S7 | Fourth lens L4 | −3.031 | 0.324 | 1.64 | 23.529 |
| S8 | | −9.083 | 0.025 | | |
| S9 | Fifth lens L5 | 1.374 | 0.729 | 1.544 | 55.987 |
| S10 | | 1.363 | 0.260 | | |
| S11 | Filter G | — | 0.210 | 1.517 | 64.198 |
| S12 | | — | 0.525 | | |
| | Imaging plane P | — | — | | |

In this embodiment, aspheric parameters of the various lenses of the optical lens 100 are shown in Tables 2-1 and 2-2.

TABLE 2-1

| Surface No. | k | $A_4$ | $A_6$ | $A_8$ | $A_{10}$ | $A_{12}$ |
|---|---|---|---|---|---|---|
| S1 | −4.80E+00 | 9.24E−01 | −2.97E−01 | −1.89E+01 | 1.81E+02 | −9.92E+02 |
| S2 | −1.00E+02 | −5.32E−01 | 3.58E−01 | 7.56E+00 | −9.60E+01 | 7.16E+02 |
| S3 | −1.00E+02 | −1.89E−01 | 2.89E+00 | −2.51E+01 | 2.89E+02 | −1.85E+03 |
| S4 | 1.92E+01 | 1.89E−01 | 3.46E+00 | −6.91E+01 | 1.10E+03 | −1.02E+04 |
| S5 | 5.84E+01 | −3.51E−01 | −4.90E+00 | 5.86E+01 | −5.81E+02 | 4.04E+03 |
| S6 | 6.46E+01 | 9.39E−02 | −6.81E+00 | 5.18E+01 | −2.87E+02 | 1.09E+03 |
| S7 | −9.37E+01 | 1.18E+00 | −5.84E+00 | 1.92E+01 | −6.41E+01 | 1.61E+02 |
| S8 | 2.03E+01 | 3.93E−02 | 1.88E+00 | −9.61E+00 | 2.21E+01 | −3.26E+01 |
| S9 | −1.74E+01 | −9.33E−01 | 9.26E−01 | −4.22E−01 | 1.62E−01 | −1.41E−01 |
| S10 | −5.52E+00 | −5.91E−01 | 6.38E−01 | −5.01E−01 | 1.04E−01 | 1.95E−01 |

TABLE 2-2

| Surface No. | $A_{14}$ | $A_{16}$ | $A_{18}$ | $A_{20}$ |
|---|---|---|---|---|
| S1 | 3.29E+03 | −6.65E−03 | 7.44E−03 | −3.48E−03 |
| S2 | −3.46E+03 | 9.83E+03 | −1.49E+04 | 9.29E+03 |
| S3 | 6.83E+03 | −1.44E+04 | 1.59E+04 | −6.96E+03 |
| S4 | 5.80E+04 | −1.95E+05 | 3.59E+05 | −2.83E+05 |
| S5 | −1.80E−04 | 4.85E+04 | −7.09E+04 | 4.25E+04 |
| S6 | −2.69E+03 | 4.10E+03 | −3.47E+03 | 1.23E+03 |
| S7 | −2.81E+02 | 3.05E+02 | −1.78E+02 | 4..20E+01 |
| S8 | 3.17E+01 | −1.91E+01 | 6.43E+00 | −9.13E−01 |
| S9 | 1.09E−01 | −4.65E−02 | 1.01E−02 | −8.94E−04 |
| S10 | −1.95E−01 | 7.88E−02 | −1.52E−02 | 1.14E−03 |

In the optical lens and imaging device provided by the first embodiment of the present disclosure, by means of reasonable coordination of the shapes of the various lenses and the combination of the focal powers of the various lenses, the size of the entire optical lens is effectively reduced, and high imaging quality is achieved at the same time. In this way, they have advantages of small size and high imaging quality, and thus can be well applicable to portable electronic devices, and can effectively improve the users shooting experience. Also, since the stop is disposed behind the second lens, the first lens and the second lens each have reduced sensitivity, and thus can be easily processed and produced.

Embodiment 2

The structure of the optical lens 100 provided by this embodiment is substantially the same as the above-mentioned first embodiment, and the biggest differences lie in the design parameters.

Figure 7:
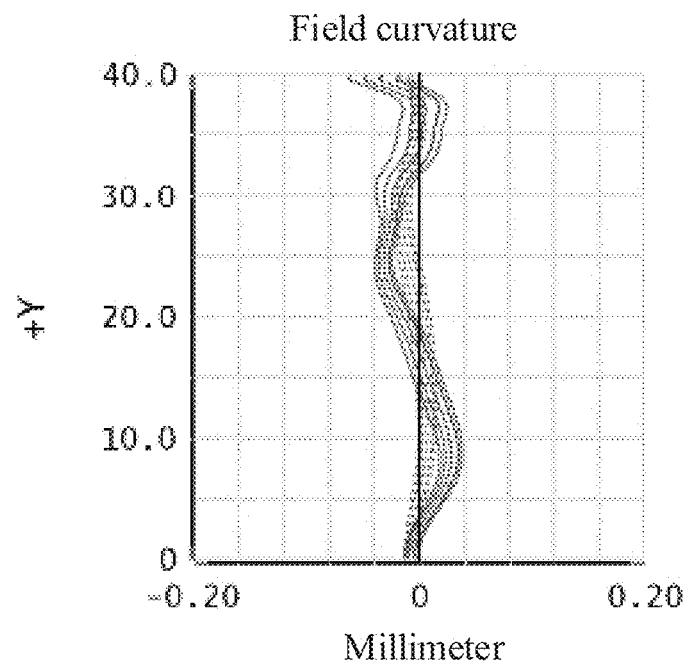
FIG. 7 is a diagram showing field curvature curves of the optical lens provided by a second embodiment of the present disclosure.
Figure 8:
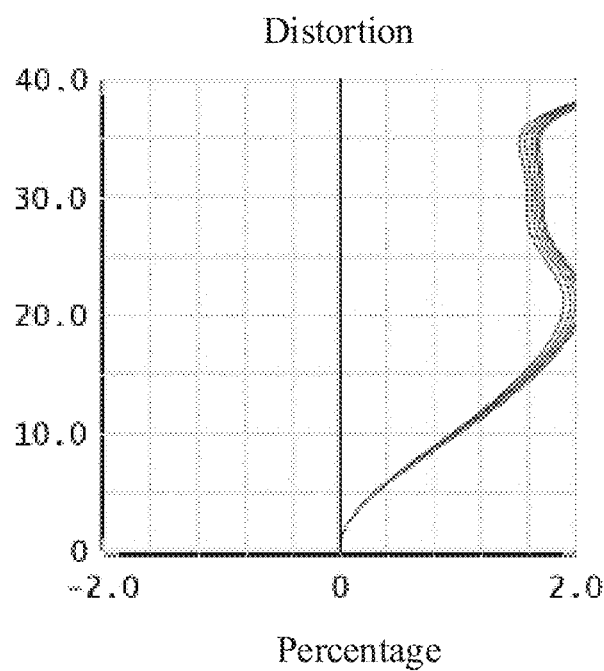
FIG. 8 is a diagram showing distortion curves of the optical lens provided by the second embodiment of the present disclosure.
Figure 9:
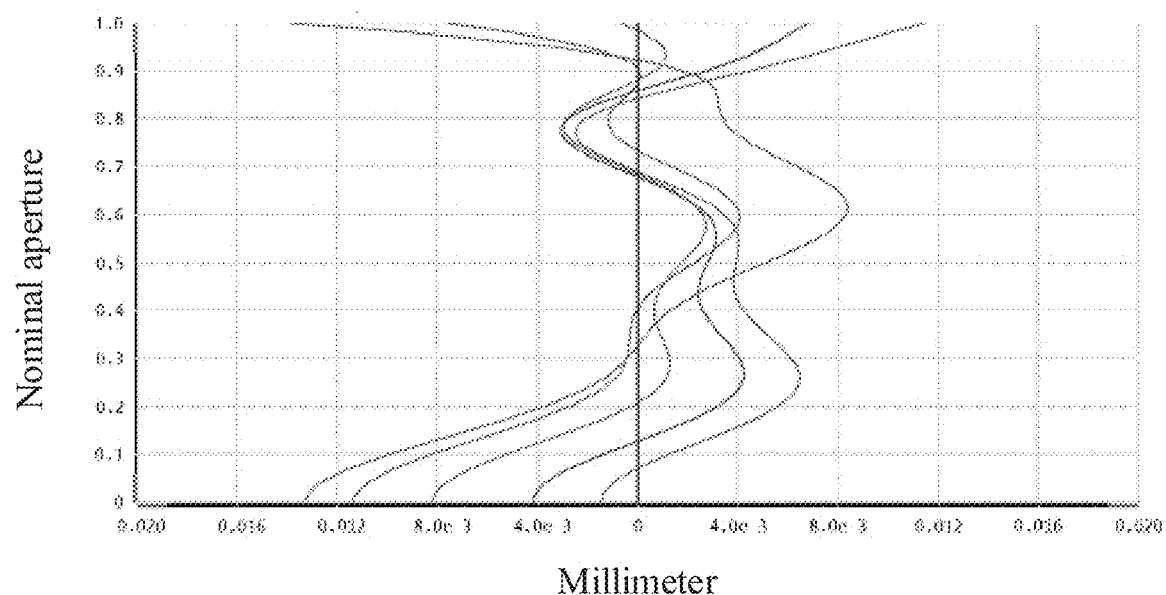
FIG. 9 is a diagram showing on-axis spherical aberration curves of the optical lens provided by the second embodiment of the present disclosure.
Figure 10:
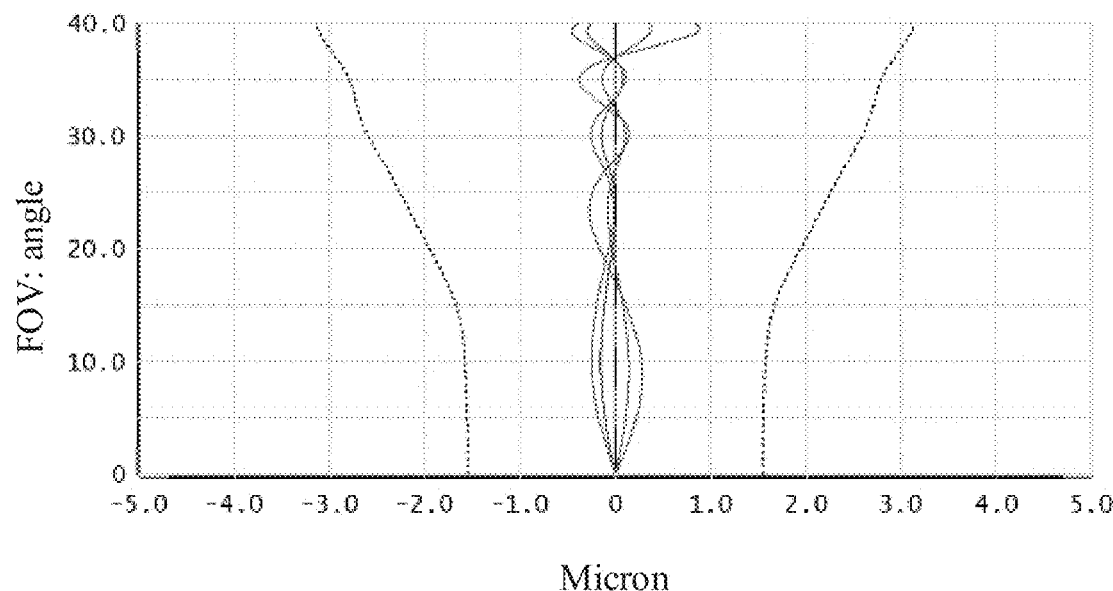
FIG. 10 is a diagram showing lateral chromatic aberration curves of the optical lens provided by the second embodiment of the present disclosure.
Figure 11:
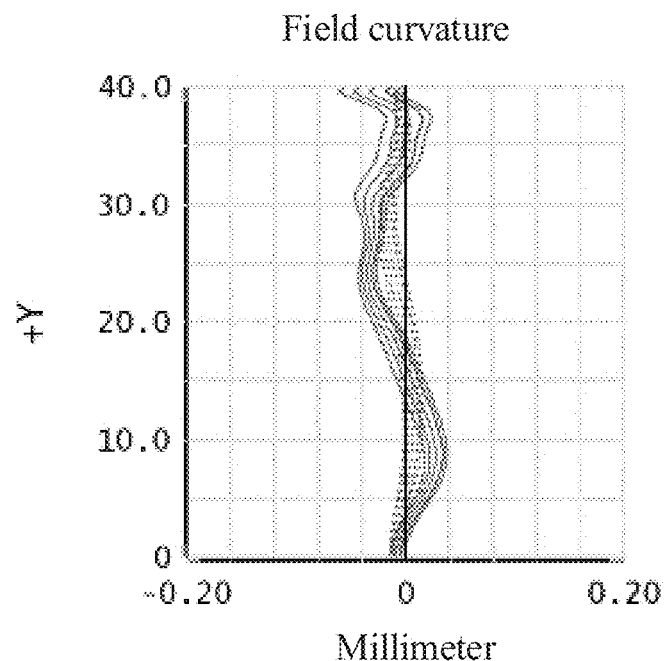
FIG. 11 is a diagram showing field curvature curves of the optical lens provided by a third embodiment of the present disclosure.
Figure 12:
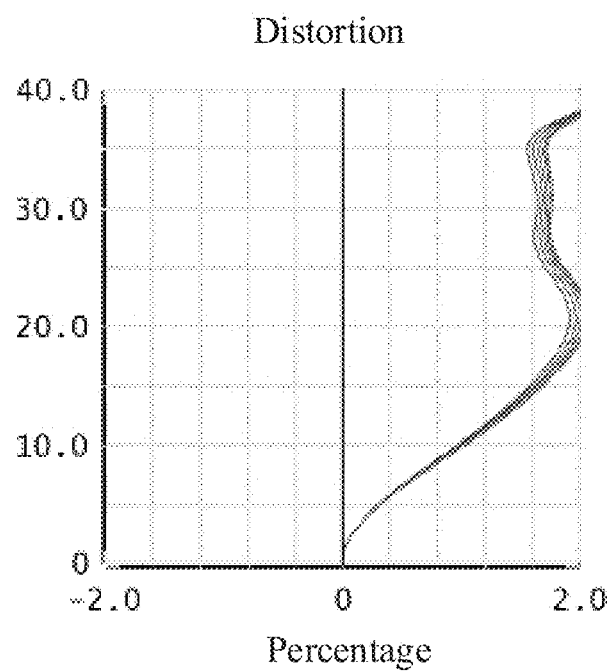
FIG. 12 is a diagram showing distortion curves of the optical lens provided by the third embodiment of the present disclosure.
Figure 13:
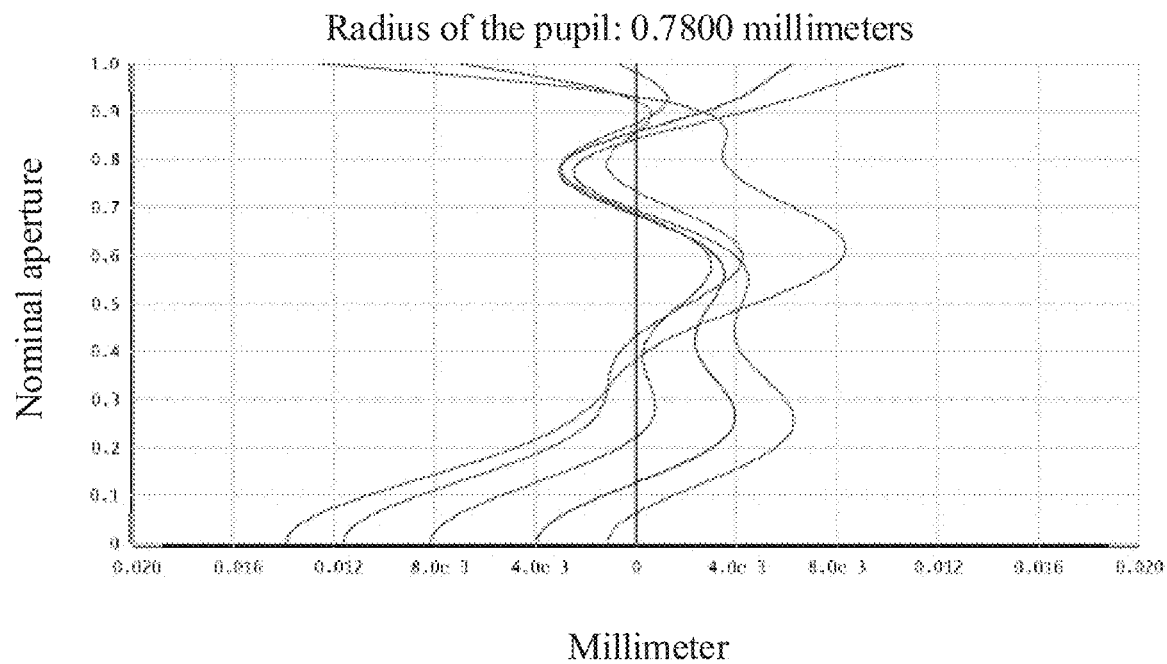
FIG. 13 is a diagram showing on-axis spherical aberration curves of the optical lens provided by the third embodiment of the present disclosure.
Figure 14:
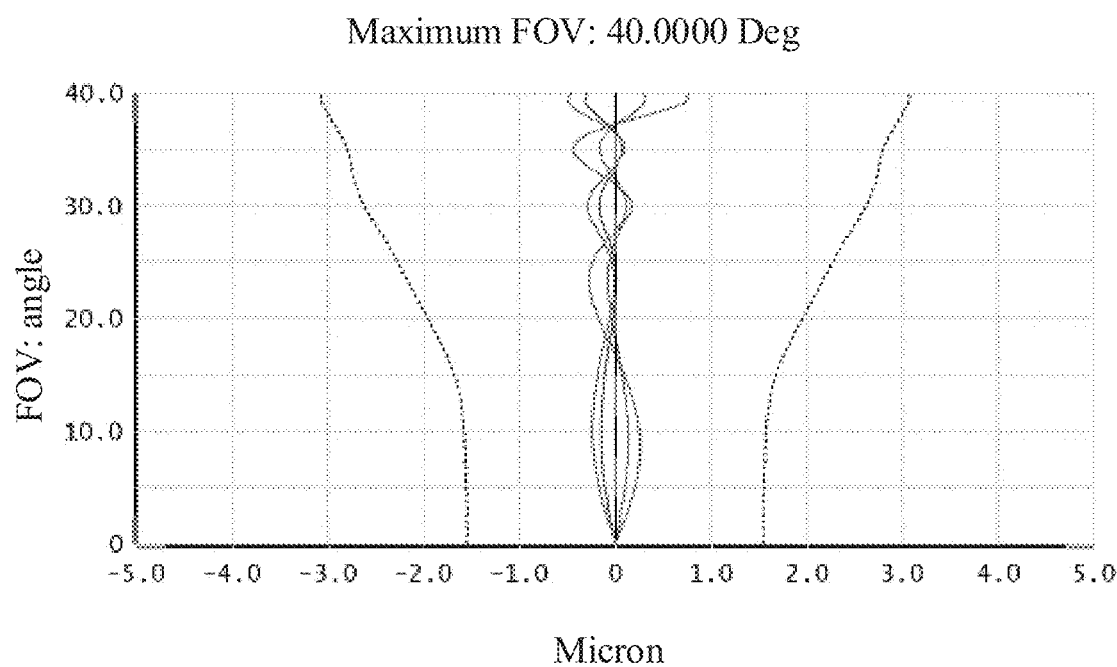
FIG. 14 is a diagram showing lateral chromatic aberration curves of the optical lens provided by the third embodiment of the present disclosure.
Figure 15:
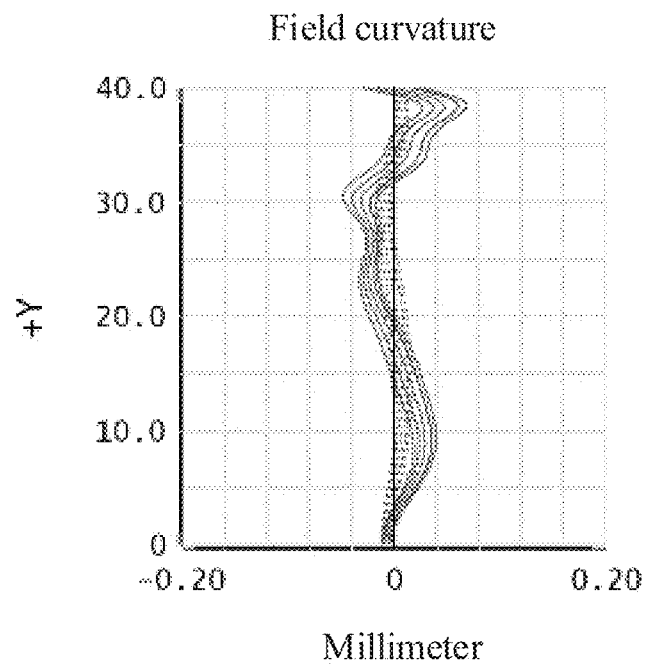
FIG. 15 is a diagram showing field curvature curves of the optical lens provided by a fourth embodiment of the present disclosure.
Figure 16:
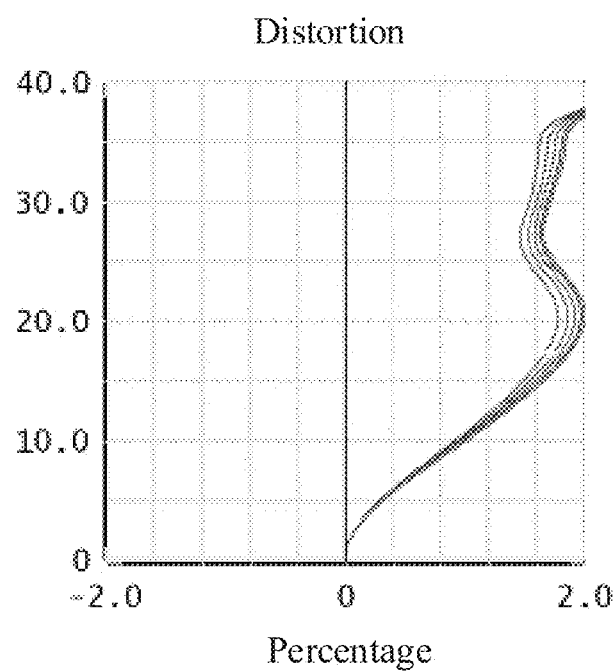
FIG. 16 is a diagram showing distortion curves of the optical lens provided by the fourth embodiment of the present disclosure.
Figure 17:
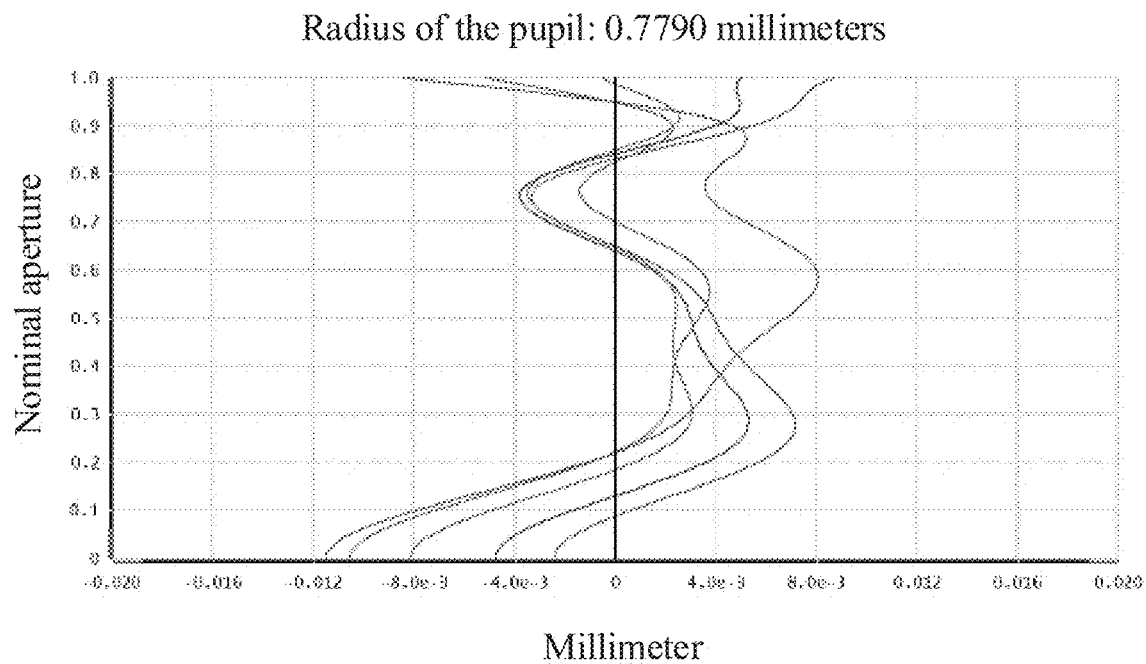
FIG. 17 is a diagram showing on-axis spherical aberration curves of the optical lens provided by the fourth embodiment of the present disclosure.
Figure 18:
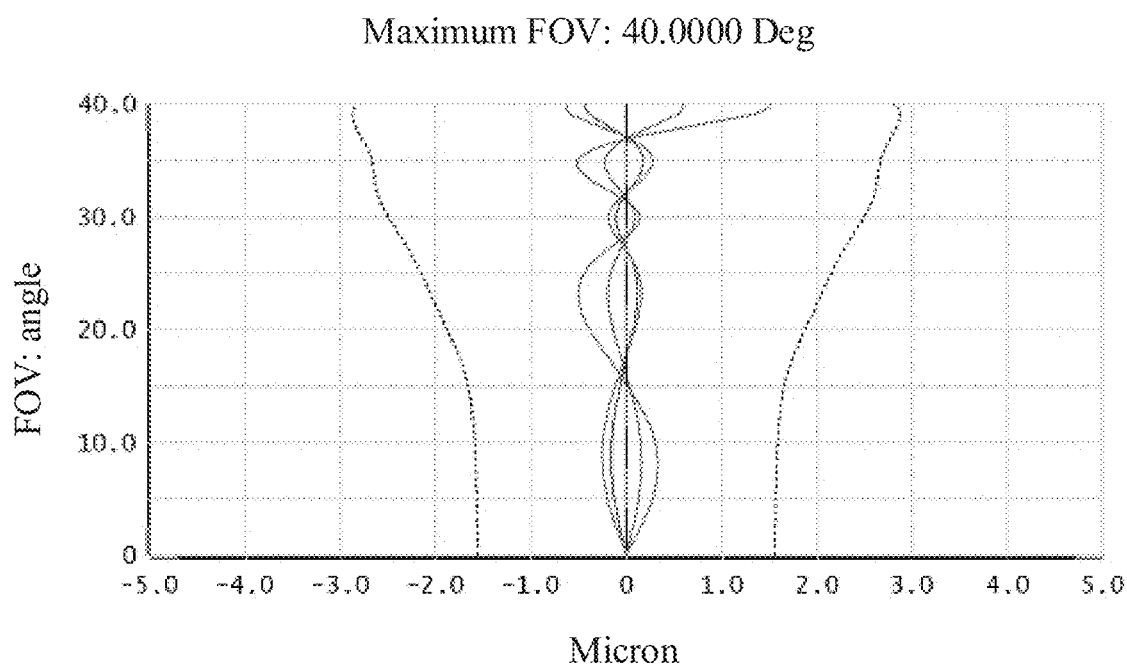
FIG. 18 is a diagram showing lateral chromatic aberration curves of the optical lens provided by the fourth embodiment of the present disclosure.

Referring to FIG. 7, FIG. 8. FIG. 9 and FIG. 10, field curvature curves, distortion curves, on-axis spherical aberration curves, and lateral chromatic aberration curves of the optical lens 100 provided in this embodiment are shown, respectively. It can be seen from the drawings that the field curvature, distortion and chromatic aberration are all well corrected.

Specifically, the design parameters of the optical lens 100 provided in this embodiment are shown in Table 3.

TABLE 3

| Surface No. | | Radius of curvature (mm) | Thickness (mm) | Refractive index | Abbe number |
|---|---|---|---|---|---|
| | Object surface | — | — | | |
| S1 | First lens L1 | 1.179 | 0.534 | | |
| S2 | | 6.512 | 0.030 | 1.544 | 55.987 |
| S3 | Second lens | 10.291 | 0.267 | | |
| S4 | L2 | 3.891 | 0.089 | 1.671 | 19.238 |
| ST | Stop ST | — | 0.226 | | |
| S5 | Third lens L3 | −7.484 | 0.320 | 1.651 | 21.514 |
| S6 | | −10.966 | 0.368 | | |
| S7 | Fourth lens L4 | −3.142 | 0.324 | 1.64 | 23.529 |
| S8 | | −9.649 | 0.025 | | |
| S9 | Fifth lens L5 | 1.413 | 0.745 | 1.544 | 55.987 |
| S10 | | 1.382 | 0.260 | | |
| S11 | Filter G | — | 0.210 | 1.517 | 64.198 |
| S12 | | — | 0.507 | | |
| | Imaging plane P | — | — | | |

In this embodiment, aspheric parameters of the various lenses of the optical lens 100 are shown in Tables 4-1 and 4-2.

TABLE 4-1

| Surface No. | k | $A_4$ | $A_6$ | $A_8$ | $A_{10}$ | $A_{12}$ |
|---|---|---|---|---|---|---|
| S1  | -4.80E+00 | 9.29E-01  | -3.12E-01 | -1.89E+01 | 1.81E+02  | -9.92E+02 |
| S2  | -1.00E+02 | -5.40E-01 | 3.62E-01  | 7.62E+00  | -9.59E+01 | 7.16E+02  |
| S3  | -1.00E+02 | -2.16E-01 | 2.95E+00  | -2.50E+01 | 2.89E+02  | -1.85E+03 |
| S4  | 1.95E+01  | 1.94E-01  | 3.48E+00  | -6.91E+01 | 1.10E+03  | -1.02E+04 |
| S5  | 6.23E+01  | -3.66E-01 | -4.95E+00 | 5.86E+01  | -5.82E+02 | 4.04E+03  |
| S6  | 6.78E+01  | 8.31E-02  | -6.82E+00 | 5.18E+01  | -2.87E+02 | 1.09E+03  |
| S7  | -9.63E+01 | 1.19E+00  | -5.86E+00 | 1.92E+01  | -6.41E+01 | 1.61E+02  |
| S8  | 2.08E+01  | 4.07E-02  | 1.87E+00  | -9.61E+00 | 2.21E+01  | -3.26E+01 |
| S9  | -1.82E+01 | -9.31E-01 | 9.26E-01  | -4.21E-01 | 1.62E-01  | -1.41E-01 |
| S10 | -5.48E+00 | -5.85E-01 | 6.34E-01  | -5.00E-01 | 1.04E-01  | 1.95E-01  |

TABLE 4-2

| Surface No. | $A_{14}$ | $A_{16}$ | $A_{18}$ | $A_{20}$ |
|---|---|---|---|---|
| S1  | 3.29E+03  | -6.65E+03 | 7.44E+03  | -3.48E+03 |
| S2  | -3.46E+03 | 9.82E+03  | -1.49E+04 | 9.29E+03  |
| S3  | 6.83E+03  | -1.44E+04 | 1.59E+04  | -6.99E+03 |
| S4  | 5.80E+04  | -1.95E+05 | 3.59E+05  | -2.84E+05 |
| S5  | -1.80E+04 | 4.85E+04  | -7.09E+04 | 4.24E+04  |
| S6  | -2.69E+03 | 4.10E+03  | -3.47E+03 | 1.23E+03  |
| S7  | -2.81E+02 | 3.05E+02  | -1.78E+02 | 4.21E+01  |
| S8  | 3.17E+01  | -1.91E+01 | 6.43E+00  | -9.13E-01 |
| S9  | 1.09E-01  | -4.65E-02 | 1.01E-02  | -8.93E-04 |
| S10 | -1.95E-01 | 7.88E-02  | -1.52E-02 | 1.14E-03  |

Embodiment 3

The structure of the optical lens 100 provided by this embodiment is substantially the same as the above-mentioned first embodiment, and the biggest differences lie in the design parameters.

Referring to FIG. 11, FIG. 12, FIG. 13 and FIG. 14, field curvature curves, distortion curves, on-axis spherical aberration curves, and lateral chromatic aberration curves of the optical lens 100 provided in this embodiment are shown, respectively. It can be seen from the drawings that the field curvature, distortion and chromatic aberration are all well corrected.

Specifically, the design parameters of the optical lens 100 provided by this embodiment are shown in Table 5.

TABLE 5

| Surface No. | | Radius of curvature (mm) | Thickness (mm) | Refractive index | Abbe number |
|---|---|---|---|---|---|
|     | Object surface | —      | —     |       |        |
| S1  | First lens L1  | 1.178  | 0.532 |       |        |
| S2  |                | 6.281  | 0.034 | 1.544 | 55.987 |
| S3  | Second lens    | 10.968 | 0.264 |       |        |
| S4  | L2             | 4.060  | 0.086 | 1.671 | 19.238 |
| ST  | Stop ST        | —      | 0.229 |       |        |
| S5  | Third lens L3  | -7.697 | 0.319 | 1.651 | 21.514 |
| S6  |                | -11.753 | 0.369 |      |        |
| S7  | Fourth lens L4 | -3.318 | 0.323 | 1.640 | 23.529 |
| S8  |                | -10.187 | 0.025 |      |        |
| S9  | Fifth lens L5  | 1.446  | 0.765 | 1.535 | 55.664 |
| S10 |                | 1.392  | 0.260 |       |        |
| S11 | Filter G       | —      | 0.210 | 1.517 | 64.198 |
| S12 |                | —      | 0.492 |       |        |
|     | Imaging plane P | —     | —     |       |        |

In this embodiment, aspheric parameters of the various lenses of the optical lens 100 are shown in Tables 6-1 and 6-2.

TABLE 6-1

| Surface No. | k | $A_4$ | $A_6$ | $A_8$ | $A_{10}$ | $A_{12}$ |
|---|---|---|---|---|---|---|
| S1  | -4.76E+00 | 9.34E-01  | -3.40E-01 | -1.89E+01 | 1.82E+02  | -9.93E+02 |
| S2  | -9.73E+01 | -5.29E-01 | 3.33E-01  | 7.70E+00  | -9.58E+01 | 7.15E+02  |
| S3  | -1.00E+02 | -2.40E-01 | 3.04E+00  | -2.50E+01 | 2.88E+02  | -1.85E+03 |
| S4  | 1.93E+01  | 1.95E-01  | 3.54E+00  | -6.89E+01 | 1.10E+03  | -1.02E+04 |
| S5  | 7.78E+01  | -3.71E-01 | -4.87E+00 | 5.85E+01  | -5.82E+02 | 4.04E+03  |
| S6  | 6.95E+01  | 6.83E-02  | -6.79E+00 | 5.18E+01  | -2.87E+02 | 1.09E+03  |
| S7  | -1.00E+02 | 1.21E+00  | -5.86E+00 | 1.92E+01  | -6.41E+01 | 1.62E+02  |
| S8  | 2.49E+01  | 4.92E-0.2 | 1.87E+00  | -9.63E+00 | 2.22E+01  | -3.26E+01 |
| S9  | -1.89E+01 | -9.27E-01 | 9.28E-01  | -4.23E-01 | 1.62E-01  | -1.41E-01 |
| S10 | -5.32E+00 | -5.77E-01 | 6.26E-01  | -4.97E-01 | 1.05E-01  | 1.95E-01  |

TABLE 6-2

| Surface No. | $A_{14}$ | $A_{16}$ | $A_{18}$ | $A_{20}$ |
|---|---|---|---|---|
| S1  | 3.29E+03  | -6.64E+03 | 7.43E+03  | -3.49E+03 |
| S2  | -3.46E+03 | 9.82E+03  | -1.48E+04 | 9.25E+03  |
| S3  | 6.85E+03  | -1.43E+04 | 1.57E+04  | -6.85E+03 |
| S4  | 5.80E+04  | -1.95E+05 | 3.59E+05  | -2.81E+05 |
| S5  | -1.80E+04 | 4.85E+04  | -7.09E+04 | 4.22E+04  |
| S6  | -2.69E+03 | 4.09E+03  | -3.47E+03 | 1.24E+03  |
| S7  | -2.82E+02 | 3.05E+07  | -1.78E+02 | 4.22E+01  |
| S8  | 3.17E+01  | -1.92E+01 | 6.43E+00  | -9.12E-01 |
| S9  | 1.09E-01  | -4.66E-02 | 1.01E-02  | -8.94E-04 |
| S10 | -1.95E-01 | 7.88E-02  | -1.52E-02 | 1.14E-03  |

Embodiment 4

The structure of the optical lens 100 provided by this embodiment is substantially the same as the above-mentioned first embodiment, and the biggest differences lie in the design parameters.

Referring to FIG. 15, FIG. 16, FIG. 17 and FIG. 18, field curvature curves, distortion curves, on-axis spherical aberration curves, and lateral chromatic aberration curves of the optical lens 100 provided in this embodiment are shown, respectively. It can be seen from the drawings that the field curvature, distortion and chromatic aberration are all well corrected.

Specifically, the design parameters of the optical lens 100 provided by this embodiment are shown in Table 7.

TABLE 7

| Surface No. | | Radius of curvature (mm) | Thickness (mm) | Refractive index | Abbe number |
|---|---|---|---|---|---|
| | Object surface | — | — | | |
| S1 | First lens L1 | 1.193 | 0.576 | | |
| S2 | | 6.722 | 0.026 | 1.544 | 55.987 |
| S3 | Second lens L2 | 109.731 | 0.279 | | |
| S4 | | 7.475 | 0.063 | 1.671 | 19.238 |
| ST | Stop ST | — | 0.249 | | |
| S5 | Third lens L3 | −6.569 | 0.314 | 1.651 | 21.514 |
| S6 | | −11.550 | 0.392 | | |
| S7 | Fourth lens L4 | −3.216 | 0.293 | 1.651 | 21.514 |
| S8 | | −12.175 | 0.025 | | |
| S9 | Fifth lens L5 | 1.439 | 0.820 | 1.544 | 55.987 |
| S10 | | 1.434 | 0.260 | | |
| S11 | Filter G | — | 0.210 | 1.517 | 64.198 |
| S12 | | — | 0.477 | | |
| | Imaging plane P | — | — | | |

In this embodiment, aspheric parameters of the various lenses of the optical lens 100 are shown in Tables 8-1 and 8-2.

TABLE 8-1

| Surface No. | k | $A_4$ | $A_6$ | $A_8$ | $A_{10}$ | $A_{12}$ |
|---|---|---|---|---|---|---|
| S1 | −4.94E+00 | 9.38E−01 | −3.25E−01 | −1.86E+01 | 1.81E+02 | −9.93E+02 |
| S2 | −1.00E+02 | −5.25E−01 | 4.25E−01 | 8.51E+00 | −9.78E+01 | 7.11E+02 |
| S3 | 7.89E+01 | −2.87E−01 | 3.00E+00 | −2.51E+01 | 2.85E+02 | 4.85E+03 |
| S4 | 3.58E+01 | 1.59E−01 | 3.19E+00 | −6.96E+01 | 1.10E+03 | −1.03E+04 |
| S5 | 8.96E+01 | −3.93E−01 | −4.99E+00 | 5.93E+01 | −5.88E+02 | 4.02E+03 |
| S6 | 1.00E+02 | 4.12E−02 | −6.67E+00 | 5.12E+01 | −2.88E+02 | 1.10E+03 |
| S7 | −1.00E+02 | 1.28E+00 | −5.86E+00 | 1.90E+01 | −6.38E+01 | 1.61E+02 |
| S8 | 5.11E+01 | 9.99E−02 | 1.83E+00 | −9.68E+00 | 2.21E+01 | −3.26E+01 |
| S9 | −1.93E+01 | −9.19E−01 | 9.24E−01 | −4.24E−01 | 1.61E−01 | −1.40E−01 |
| S10 | −4.98E+00 | −5.69E−01 | 6.22E−01 | −4.98E−01 | 1.05E−01 | 1.96E−01 |

TABLE 8-2

| Surface No. | $A_{14}$ | $A_{16}$ | $A_{18}$ | $A_{20}$ |
|---|---|---|---|---|
| S1 | 3.30E+03 | −6.67E+03 | 7.49E+03 | −3.57E+03 |
| S2 | −3.46E+03 | 9.82E+03 | −1.48E+04 | 9.16E+03 |
| S3 | 6.84E+03 | −1.44E+04 | 1.56E+04 | −6.50E+03 |
| S4 | 5.79E+04 | −1.95E+05 | 3.60E+05 | −2.84E+05 |
| S5 | −1.80E+04 | 4.90E+04 | −7.06E+04 | 3.60E+04 |
| S6 | −2.70E+03 | 4.09E+03 | −3.47E−03 | 1.26E+03 |
| S7 | −2.81E+02 | 3.04E+02 | −1.77E+02 | 4.25E+01 |
| S8 | 3.17E+01 | −1.92E+01 | 6.43E+00 | −9.08E−01 |
| S9 | 1.09E−01 | −4.65E−02 | 1.01E−02 | −8.94E−04 |
| S10 | −1.94E−01 | 7.83E−02 | −1.51E−02 | 1.15E−03 |

Referring to Table 9, optical characteristics and values related to the above expressions of the optical lens 100 corresponding to the above four embodiments are shown, the optical characteristics including the focal length f of the optical lens 100, the aperture number F #, the total optical length TTL and the field of view (FOV) 2θ.

TABLE 9

| | Embodiment 1 | Embodiment 2 | Embodiment 3 | Embodiment 4 |
|---|---|---|---|---|
| f (mm) | 3.398 | 3.395 | 3.398 | 3.393 |
| F# | 2.28 | 2.28 | 2.28 | 2.28 |
| TTL (mm) | 3.90 | 3.90 | 3.91 | 3.94 |
| 2θ | 80° | 80° | 80° | 80° |
| $f_{12}/f_{345}$ | −0.395 | −0.404 | −0.411 | −0.470 |
| $CT_{2-i}/CT_2$ | 0.933 | 0.931 | 0.928 | 0.931 |
| $CT_{3-i}/CT_3$ | 1.167 | 1.165 | 1.162 | 1.125 |
| $f_1/f$ | 0.746 | 0.750 | 0.753 | 0.757 |
| $f_5/f$ | 4.107 | 4.546 | 5.174 | 3.916 |
| $(R_7 + R_8)/(R_7 − R_8)$ | −2.001 | −1.966 | −1.966 | −1.718 |
| $R_9/f_5$ | 19.184 | 21.804 | 25.422 | 19.123 |
| Td/ImgH | 1.273 | 1.281 | 1.289 | 1.307 |

For the above embodiments, the thickness, radius of curvature, and material of each lens of the optical lens 100 are partially different, which may refer to the tables of the parameters in the above embodiments. It can be seen from the field curvature and distortion curves of the above embodiments that, the field curvature of the optical lens in each of the embodiments is less than 0.1 mm, and the distortion of the optical lens is less than 2%, which shows that the resulting image has low distortion and high definition.

In summary, in the optical lens and imaging device provided by the embodiments of the present disclosure, by means of the reasonable coordination of the shapes of the various lenses and the combination of the focal powers of the various lenses, the size of the entire optical lens is effectively reduced, and the length of the optical lens is effectively controlled to satisfy TTL<4.0 mm. In addition, the field of view of the optical lens is enabled to satisfy 2θ≥80°, which provides a large shooting range, satisfying the requirements of wide-angle shooting. By disposing the stop behind the second lens, the sensitivity of the first lens and the second lens is effectively reduced, and thus the first and second lenses can be easily processed and produced, which facilitates the improvement of product yield. That is, the optical lens provided by the embodiments of the present disclosure has advantages of a small size, a wide field of view, and high imaging quality, which can be well applicable to portable electronic devices, and can effectively improve the user's shooting experience.

Embodiment 5

Figure 19:
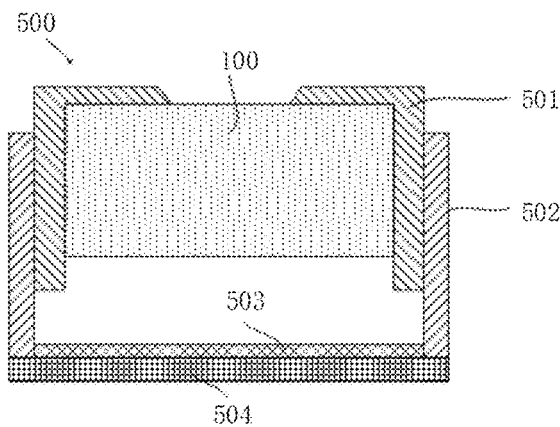
FIG. 19 is a schematic structural diagram showing a cross-section of a camera module provided by a fifth embodiment of the present disclosure.

Referring to FIG. 19, a cross-section of a camera module 500 provided by this embodiment is illustrated. The camera module 500 includes a barrel 501, a holder 502, an image sensor 503, a printed circuit board 504, and the optical lens 100 provided by any of the embodiments as described above. The optical lens 100 is received in the barrel 501, and the barrel 501 is engaged with the holder 502. The image sensor 503 and the printed circuit board 504 are substantially accommodated in the holder 502. The image sensor 503 is opposite to the optical lens 100 and is mounted on the printed circuit board 504. The image sensor 503 is configured for converting images formed by the optical lens 100 into electrical signals, thereby the images formed by the optical lens 100 can be converted and transmitted to a processor. The printed circuit board 504 can be further electrically connected to a chip or the processor via a flexible circuit board.

Embodiment 6

Figure 20:
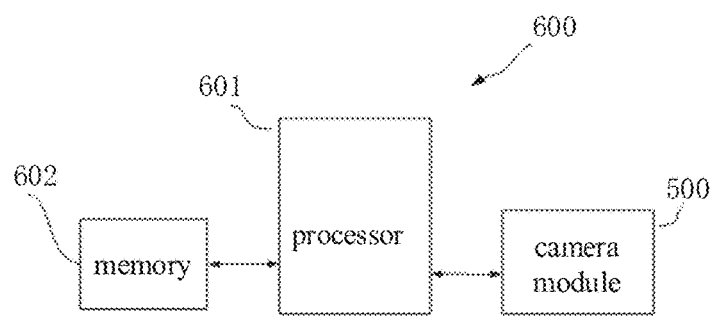
FIG. 20 is a schematic block diagram of a camera provided by a sixth embodiment of the present disclosure.
Figure 21:
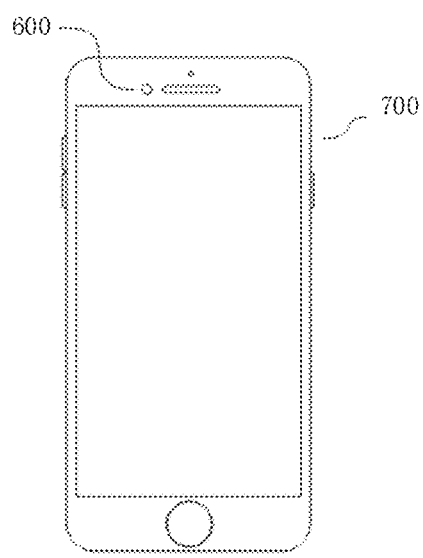
FIG. 21 is a schematic diagram of the camera provided by the sixth embodiment of the present disclosure.

Referring to FIG. 20 and FIG. 21, a camera 600 is applied to an electronic device 700. Here, the camera 600 is illustrated as a front camera of an electronic device, but it also may be a rear camera of the electronic device, which is not limited in the embodiments of the present disclosure. The camera 600 includes the camera module 500 as mentioned above, a processor 601, and a memory 602. The camera module 500 is configured to capture one or more images, the processor 601 is configured to process the captured one or more images, and the memory 602 is configured to store the captured one or more images. The processor 601 is communicated with the camera module 500 and the memory 602. That is, the electrical signals of the images can be transmitted to the processor 601 and stored in the memory 602.

Finally, it should be noted that, the above embodiments are only used to illustrate several solutions of the present disclosure, rather than limiting the disclosure. In addition, although the disclosure has been detailed with reference to the above embodiments, those skilled in the art should understand that the technical solutions described in the above embodiments can also be modified, or some features thereof can be equivalently replaced, and such modification and replacement do not render the respective solution depart from the spirit and scope of the solutions provided by the various embodiments of the disclosure.

What is claimed is:

1. An optical lens, wherein from an object side to an image side along an optical axis, the optical lens sequentially comprises:
a first lens with a positive focal power, wherein an object side surface of the first lens is convex;
a second lens with a negative focal power;
a stop;
a third lens with a negative focal power;
a fourth lens with a negative focal power;
a fifth lens with a positive focal power, wherein an object side surface of the fifth lens is convex at a paraxial region thereof, and an image side surface of the fifth lens is concave at a paraxial region thereof; and
a filter disposed between the fifth lens and an imaging plane;
wherein the first lens, the second lens, the third lens, the fourth lens and the fifth lens are plastic aspherical lenses, and the optical lens satisfies expressions:

$-1 < f_{12}/f_{345} < 0$;

$0.8 < CT_{2-i}/CT_2 < 1.2$; and $0.8 < CT_{3-i}/CT_3 < 1.2$;

where $f_{12}$ is a combined focal length of the first lens and the second lens, $f_{345}$ is a combined focal length of the third lens, the fourth lens and the fifth lens, $CT_{2-i}$ is a thickness at any position of the second lens along a normal direction, $CT_{3-i}$ is a thickness at any position of the third lens along a normal direction, $CT_2$ is a center thickness of the second lens, and $CT_3$ is a center thickness of the third lens.

2. The optical lens according to claim 1, wherein the optical lens satisfies an expression:

$0 < f_1/f < 1$;

where $f_1$ is a focal length of the first lens, and f is a focal length of the optical lens.

3. The optical lens according to claim 1, wherein the optical lens satisfies an expression:

$3 < f_5/f < 6$;

where $f_5$ is a focal length of the fifth lens, and f is a focal length of the optical lens.

4. The optical lens according to claim 1, wherein the optical lens satisfies an expression:

$-3 < (R_7+R_8)/(R_7-R_8) < 0$;

where $R_7$ is a radius of curvature of an object side surface of the fourth lens, and $R_8$ is a radius of curvature of an image side surface of the fourth lens.

5. The optical lens according to claim 1, wherein the optical lens satisfies an expression:

$15 < R_9/f_5 < 30$;

where $R_9$ is a radius of curvature of the object side surface of the fifth lens, and $f_5$ is a focal length of the fifth lens.

6. The optical lens according to claim 1, wherein the optical lens satisfies an expression:

$0 < Td/ImgH < 2$;

where Td is a distance on the optical axis that is between the object side surface of the first lens and the image side surface of the fifth lens, and ImgH is half of an image height of the optical lens on the imaging plane.

7. The optical lens according to claim 1, wherein an object side surface of each of the third lens and the fourth lens is concave, and an image side surface of each of the third lens and the fourth lens is convex.

8. The optical lens according to claim 1, wherein an image side surface of the second lens is concave.

9. The optical lens according to claim 1, wherein the maximum diameter of the fifth lens is greater than that of each of the first lens, the second lens, the third lens and the fourth lens, and a diameter of the stop is smaller than the maximum diameter of the second lens.

10. The optical lens according to claim 1, wherein a center thickness of the fifth lens is greater than that of each of the first lens, the second lens, the third lens and the fourth lens.

11. The optical lens according to claim 1, wherein a distance between the third lens and the fourth lens on the optical axis is greater than a distance between the stop and the third lens on the optical axis.

12. The optical lens according to claim 1, wherein at least a portion away from the optical axis of the object side surface of the fifth lens is concave, and at least a portion away from the optical axis of the image side surface of the fifth lens is convex.

13. The optical lens according to claim 1, wherein a distance between the stop and the third lens is greater than a distance between the stop and the second lens.

14. The optical lens according to claim 1, wherein a center thickness of the first lens is greater than a center thickness of the second lens.

15. A camera module, comprising an optical lens and an image sensor opposite to the optical lens, wherein from an object side to an image side along an optical axis, the optical lens comprises:
- a first lens having a positive focal power, wherein an object side surface of the first lens is convex;
- a second lens having a negative focal power;
- a third lens having a negative focal power;
- a fourth lens having a negative focal power;
- a fifth lens having a positive focal power, wherein an object side surface of the fifth lens is convex at a paraxial region thereof, and an image side surface of the fifth lens is concave at a paraxial region thereof;
- a stop disposed between the second lens and the third lens; and
- a filter disposed between the fifth lens and an imaging plane;

wherein the first lens, the second lens, the third lens, the fourth lens and the fifth lens are all plastic aspherical lenses, and the optical lens satisfies expressions:

$0 < f_1/f < 1;$ where $f_1$ is a focal length of the first lens, and f is a focal length of the optical lens.

16. The camera module according to claim 15, wherein the optical lens satisfies expressions:

$-1 < f_{12}/f_{345} < 0;$ and $3 < f_5/f < 6;$ where $f_{12}$ is a combined focal length of the first lens and the second lens, $f_{345}$ is a combined focal length of the third lens, the fourth lens and the fifth lens, and $f_5$ is a focal length of the fifth lens.

17. The camera module according to claim 15, wherein the optical lens satisfies expressions:

$0.8 < CT_{2-i}/CT_2 < 1.2;$ $0.8 < CT_{3-i}/CT_3 < 1.2;$ where $CT_{2-i}$ is a thickness at any position of the second lens along a normal direction, $CT_{3-i}$ is a thickness at any position of the third lens along a normal direction, $CT_2$ is a center thickness of the second lens, $CT_3$ is a center thickness of the third lens.

18. The camera module according to claim 15, wherein the optical lens satisfies expressions:

$-3 < (R_7+R_8)/(R_7-R_8) < 0;$ $15 < R_9/f_5 < 30;$ where $R_7$ is a radius of curvature of an object side surface of the fourth lens, $R_8$ is a radius of curvature of an image side surface of the fourth lens, $R_9$ is a radius of curvature of the object side surface of the fifth lens, and $f_5$ is a focal length of the fifth lens.

19. The camera module according to claim 15, wherein the optical lens satisfies an expression:

$0 < Td/ImgH < 2;$ where Td is a distance on the optical axis that is between the object side surface of the first lens and the image side surface of the fifth lens, and ImgH is half of an image height of the optical lens on the imaging plane.

20. A camera, comprising:
- a camera module, configured to capture one or more images;
- a processor, configured to process the captured one or more images; and
- a memory, configured to store the captured one or more images;

wherein the camera module comprises an optical lens and an image sensor opposite to the optical lens;

wherein from an object side to an image side along an optical axis, the optical lens comprises:
- a first lens having a positive focal power, wherein an object side surface of the first lens is convex;
- a second lens having a negative focal power;
- a third lens having a negative focal power;
- a fourth lens having a negative focal power:
- a fifth lens having a positive focal power, wherein an object side surface of the fifth lens is convex at a paraxial region thereof, and an image side surface of the fifth lens is concave at a paraxial region thereof;
- a stop disposed between the second lens and the third lens; and
- a filter disposed between the fifth lens and an imaging plane;

wherein the first lens, the second lens, the third lens, the fourth lens and the fifth lens are all plastic aspherical lenses, and the optical lens satisfies expressions:

$0.8 < CT_{2-i}/CT_2 < 1.2;$ $3 < f_5/f < 6;$ where $CT_{2-i}$ is a thickness at any position of the second lens along a normal direction, $CT_2$ is a center thickness of the second lens, $f_5$ is a focal length of the fifth lens, and f is a focal length of the optical lens.

* * * * *